United States Patent Office 2,890,249
Patented June 9, 1959

2,890,249

4-[2′,6′,6′-TRIMETHYLCYCLOHEXEN-(2′)-YLIDENE]-2-METHYL-BUTEN-(2)-AL-(1)

Hans Herloff Inhoffen, Braunschweig, Germany, and Otto Isler, Marc Montavon, and Rudolf Rüegg, Basel, and Paul Zeller, Neuallschwil, Switzerland, assignors to Hoffmann-La Roche Inc., Nutley, N.J., a corporation of New Jersey No Drawing. Application August 10, 1955
Serial No. 527,643

Claims priority, application Switzerland August 16, 1954

1 Claim. (Cl. 260—598)

The object of the present invention is a process for the preparation of 4-[2′,6′,6′-trimethylcyclohexylidene]-2-methylbuten-(2-al)-(1) and of 4-[2′,6′,6′-trimethylcyclohexen - (2′) - ylidene] - 2 - methylbuten - (2) - al - (1), which in the following are called iso-$C_{14}$-aldehyde and retrodehydro-$C_{14}$-aldehyde. The process is characterized by the fact that the aldehyde of the formula

in which R is the 2,6,6-trimethylcyclohexylidene radical, which radical may be unsaturated in the 2,3-position, is acetalized, the acetal obtained is condensed with a propenylether in the presence of an acid condensation agent and the condensation product obtained is treated with acid.

The 2,6,6-trimethylcyclohexylidene or 2,6,6-trimethylcyclohexen-(2)-ylidene acetaldehyde (iso- or retro-dehydro-$C_{11}$-aldehyde) required as starting material can be obtained as follows:

The ethoxyacetylenecarbinol obtained by the condensation of ethoxyacetylene with 2,6,6-trimethylcyclohexanone-(1) or with 2,6,6-trimethylcyclohexen-(2)-one-(1) respectively, is partially hydrogenated in the known manner at the triple bond and treated with acid. The 2,6,6-trimethylcyclohexylideneacetaldehyde obtained from trimethylcyclohexanone is a colorless oil, B.P.$_{.12}$, 110° C.; $n_D^{25}$=1.496; ultraviolet absorption maximum at 237–38 mμ (in petroleum-ether solution). The 2,6,6-trimethylcyclohexen-(2)-ylideneacetaldehyde obtained from trimethylcyclohexanone is a yellowish oil, B.P.$_{.13}$, 115° C.; $n_D^{25}$=1.531; ultraviolet absorption maximum at 278 mμ (in petroleum-ether solution). (See copending application Ser. No. 479,217, filed December 31, 1954, and now Patent Number 2,798,095.)

The first step of the process in accordance with the invention is the acetalizing of the iso- or retrodehydro-$C_{11}$-aldehyde into 2,6,6-trimethylcyclohexylidene or 2,6,6-trimethylcyclohexen-(2)-ylidene acetaldehydeacetal (iso- or retrodehydro-$C_{11}$-acetal) respectively. This is done in the known manner. The acetalization is for instance effected by means of an orthoester in the presence of an acid condensation agent, such as boron trifluoride etherate, zinc chloride, ammonium nitrate, phosphoric acid, p-toluenesulfonic acid, etc. There are particularly well suited for this purpose the orthoesters of lower aliphatic acids with lower aliphatic alcohols, and preferably the methyl-, ethyl- or n-butyl esters of orthoformic acid. The acetals obtained are colorless oils. The iso-$C_{11}$-acetals do not show an absorption maximum above 225 mμ in the ultraviolet spectrum, while a maximum at 240 mμ is characteristic for the retrodehydro-$C_{11}$-acetals. For further use, a special purification of the acetals, as for instance, by distillation, is not necessary.

In the second step of the process, the iso- or retrodehydro-$C_{11}$-acetal is condensed with a propenylether in the presence of an acid condensation agent forming 4-[2′,6′,6′-trimethylcyclohexylidene]- or 4-[2′,6′,6′-trimethylcyclohexen - (2′) - ylidene] - 2 - methylbutane - ether-(3) - acetal - (1) (iso - or retrodehydro - $C_{14}$ - etheracetal) respectively. As condensation agent there may be used boron trifluoride etherate, zinc chloride, titanium tetrachloride, aluminum trichloride, ferric chloride, tin tetrachloride, etc. The propenylether of the same alcohol with which the iso- or retrodehydro-$C_{11}$-aldehyde was acetalized is preferably used, for instance methylpropenylether, ethylpropenylether or n-butylpropenylether. The condensation is carried out at the lowest possible reaction temperature so that undesired side reactions such as polymerization and condensation of the iso- or retrodehydro-$C_{14}$-etheracetal formed with propenylether can be avoided. The optimum reaction temperature is between 0 and 50° C., depending on the condensation agent used and the acetal and propenylether selected for the condensation. In the preferred embodiment, approximately molar quantities of iso- or retrodehydro-$C_{11}$-acetal and propenylether are allowed to react with each other at 0 to 30° C. in the presence of zinc chloride. In this way, there is obtained substantially pure iso- or retrodehydro-$C_{14}$-etheracetals in almost quantitative yield. They are colorless oils. In the ultraviolet spectrum, the iso-$C_{14}$-etheracetals do not exhibit any absorption maximum above 225 mμ, while a maximum of 235 mμ is characteristic of the retrodehydro-$C_{14}$-etheracetals. For further use special purification, such as by distillation, is not necessary.

The third step of the process in accordance with the invention consists in hydrolyzing the iso- or retrodehydro-$C_{14}$-etheracetals respectively in known manner in an acid medium; this reaction can be advantageously carried out in such a manner, for instance by heating, that the iso- or retrodehydro-$C_{14}$-aldehyde respectively is formed with the simultaneous splitting off of alcohol from the 2,3-position. This reaction step is carried out in the presence of water-soluble, organic or inorganic acids, such as p-toluene-sulfonic acid, acetic acid, propionic acid, oxalic acid, sulfuric acid, phosphoric acid or water-soluble salts having an acid reaction, such as zinc chloride and sodium bisulfate. Oxygen is preferably excluded while carrying out the reaction and an antioxidant, for instance hydroquinone, is added. The operation is preferably carried out under conditions in which the alcohol produced is continuously removed from the reaction mixture. A solvent miscible with water, such as dioxane, tetrahydrofuran, ethyleneglycol-dimethylether, etc., is added to the reaction mixture in order to obtain a homogeneous reaction mixture. The iso- or retrodehydro-$C_{14}$-etheracetal respectively is preferably heated with dilute phosphoric acid in the presence of a water-miscible solvent or with acetic acid, with the addition of an alkali acetate and a small amount of water at a temperature of about 100° C. Upon diluting the reaction mixture with water, the oily iso- or retrodehydro-$C_{14}$-aldehyde respectively separates and can be purified by distillation.

In order to avoid losses of substance by polymerization and decomposition, it is advisable to avoid temperatures of more than 120° C. during the entire process and in particular continue working with the intermediate products, namely iso- or retrodehydro-$C_{11}$-acetal respectively and iso- or retrodehydro-$C_{14}$-etheracetal respectively, in undistilled state.

The iso-$C_{14}$-aldehyde obtained in accordance with the present process boils at 82° C. at 0.05 mm. It has an absorption maximum in the ultraviolet spectrum at 287 to 288 mμ;

E$_1^1$: 1400 (in petroleum-ether solution)

The retrodehydro-$C_{14}$-aldehyde boils at 94° C. at 0.05 mm. It has an absorption maximum in the ultraviolet spectrum at 318 mµ;

$E_1^1$: 1670 (in petroleum-ether solution)

The iso-$C_{14}$-aldehyde and the retrodehydro-$C_{14}$-aldehyde are valuable intermediates for the synthesis of vitamin A and vitamin $A_2$ respectively and of β-carotene or carotenoids respectively. They are perfumes, having fixative properties, and having odors reminiscent of β-ionone.

EXAMPLE 1

Retrodehydro-$C_{11}$-acetal

To a solution of 16 parts by weight 2,6,6-trimethylcyclohexen-(2)-ylidene-acetaldehyde in 18 parts by volume ethylorthoformate, there is added a solution of 0.3 part by volume orthophosphoric acid in 3 parts by volume of absolute ethyl alcohol and the mixture is set aside for 15 hours at 20 to 25° C. There are then added 5 parts by volume pyridine and the entire mixture is poured into a mixture of 20 parts by weight of 5% sodium bicarbonate solution and 10 parts by weight of ice. It is extracted with petroleum-ether, shaken with sodium bicarbonate solution and dried over potash. After the concentration of the petroleum-ether solution, the residue is freed in vacuum at 70° C. from the excess ethylorthoformate and the ethylformate produced. There are obtained 22 parts by weight crude 2,6,6-trimethylcyclohexen-(2)-ylidene-acetaldehyde-diethylacetal, which is sufficiently pure for further use. A colorless product can be obtained by distillation; B.P.$_{13}$, 130 to 132° C.; $n_D^{23}$=1.4805; ultraviolet absorption maximum at 240 mµ (in petroleum-ether solution).

Retrodehydro-$C_{14}$-etheracetal

To 20 parts by weight 2,6,6-trimethylcyclohexen-(2)-ylidene-acetaldehyde-diethylacetal there is added 1 part by volume of a 10% solution of zinc chloride in ethyl-acetate. There are then added, while stirring, at 25 to 35° C. over the course of 2 hours simultaneously 8 parts by volume of propenylethylether and 6 parts by volume of a 10% solution of zinc chloride in ethyl acetate, whereupon the mixture is set aside for a further 15 hours at room temperature. It is then extracted in petroleum-ether, washed with dilute caustic soda solution and dried over potash. After the solvent has been distilled off, there are obtained 28 parts by weight of crude 4-[2',6',6'-trimethylcyclohexen - (2') - ylidene] - 2 - methylbutane-ether-(3)-diethylacetal-(1), which can be further used for reaction without further purification. By distillation there can be obtained a colorless product of a B.P.$_{0.3}$=120 to 125° C.; $n_D^{22}$=1.4715; ultraviolet absorption maximum at 235 mµ (in petroleum-ether solution).

Retrodehydro-$C_{14}$-aldehyde

To 28 parts by weight 4-[2',6',6'-trimethylcyclohexen-(2') - ylidene] - 2 - methylbutane - ether - (3) - diethylacetal-(1) there are added 60 parts by volume glacial acetic acid, 6 parts by weight sodium acetate and 3 parts by volume water, and heated after the addition of a trace of hydroquinone for 6 hours in a nitrogen atmosphere at a temperature of 95° C. It is then cooled to 30 to 40° C. and poured onto 50 parts by weight of ice and 50 parts by volume of water. The oily reaction product is extracted in petroleum-ether, washed with sodium bicarbonate solution and with water and dried over sodium sulfate. After the concentration of the petroleum-ether solution, the residue is distilled in a high vacuum. There are obtained 14 parts by weight of 4-[2',6',6'-trimethylcyclohexen - (2') - ylidene] - 2 - methylbuten - (2) - al - (1) of B.P.$_{0.05}$=94° C.; $n_D^{24}$=1.610; ultraviolet absorption maximum at 318 mµ;

$E_1^1$=1670 (in petroleum-ether solution)

EXAMPLE 2

Iso-$C_{14}$-aldehyde

To a solution of 110 parts by weight of 2,6,6-trimethylcyclohexylidene-acetaldehyde in 120 parts by volume ethylorthoformate, there is added a solution of 2 parts by volume orthophosphoric acid in 18 parts by volume of absolute ethanol, and the mixture is set aside for 15 hours at 20 to 25° C. Thereupon 20 parts by volume of pyridine are added, and the mixture is poured onto a mixture of 200 parts by weight of 5% sodium bicarbonate solution and 100 parts by weight of ice. It is dissolved in petroleum-ether, shaken with sodium bicarbonate solution and dried over potash. After the concentration of the petroleum-ether solution, the residue is freed in vacuum at 70° C. from excess ethylorthoformate and ethylformate which has been produced. The residue consists of 150 parts by weight 2,6,6-trimethylcyclohexylidene-acetaldehyde-diethylacetal of $n_D^{23}$=1.464, which does not show any absorption maximum above 225 mµ in the ultraviolet spectrum. This product is condensed with propenylether without further purification. For this purpose 9 parts by volume of a 10% solution of zinc chloride in ethylacetate are added, whereupon 65 parts by volume of propenylethylether and 43 parts by volume of a 10% solution of zinc chloride in ethylacetate are added simultaneously over the course of 2 hours while stirring at 30 to 35° C., the stirring being continued for a further 20 hours at room temperature. The 4-[2',6',6'-trimethylcyclohexylidene] - 2 - methylbutane - ether - (3) - diethylacetal - (1) of $n_D^{23}$=1.459 obtained in this manner is added, for saponification and splitting off of alcohol, to a mixture of 450 parts by volume of glacial acetic acid, 45 parts by weight sodium acetate and 22 parts by volume of water and heated for 6 hours at 95° C. in a nitrogen atmosphere. It is then cooled to 30 to 40° C. and poured onto 400 parts by weight of ice and 400 parts by volume of water. The oily reaction product is dissolved in petroleum-ether, washed with 5% sodium bicarbonate solution and with water, and dried over sodium sulfate. After the concentration of the petroleum-ether solution, the residue is distilled in a high vacuum. There are obtained 90 parts by weight of 4-[2',6',6'-trimethylcyclohexylidene] - 2 - methylbuten - (2) - al - (1) of B.P.$_{0.05}$=82 to 84° C.; $n_D^{23}$=1.547; ultraviolet absorption maximum at 288 mµ;

$E_1^1$=1400 (in petroleum-ether solution)

We claim:

4 - [2',6',6' - trimethylcyclohexen - (2') - ylidene] - 2-methylbuten-(2)-al-(1).

References Cited in the file of this patent

UNITED STATES PATENTS

| | | |
|---|---|---|
| 2,586,305 | Copenhaver | Feb. 19, 1952 |
| 2,730,549 | Isler et al. | Jan. 10, 1956 |
| 2,812,354 | Isler et al. | Nov. 5, 1957 |

UNITED STATES PATENT OFFICE
CERTIFICATE OF CORRECTION

Patent No. 2,890,249                                                            June 9, 1959

Hans Herloff Inhoffen et al.

It is hereby certified that error appears in the printed specification of the above numbered patent requiring correction and that the said Letters Patent should read as corrected below.

Column 1, line 19, for "-(2-al-(1)" read -- -(2)-al-(1) --; line 24, for "R=CH-CH" read -- R=CH-CHO --; line 46, for "trimethylcyclohexanone" read -- trimethylcyclohexenone --.

Signed and sealed this 6th day of October 1959.

(SEAL)
Attest:
KARL H. AXLINE
  Attesting Officer

ROBERT C. WATSON
Commissioner of Patents